(12) United States Patent
Bartley et al.

(10) Patent No.: US 7,783,793 B2
(45) Date of Patent: *Aug. 24, 2010

(54) HANDLING DMA OPERATIONS DURING A PAGE COPY

(75) Inventors: Gerald Keith Bartley, Rochester, MN (US); John Michael Borkenhagen, Rochester, MN (US); William Paul Hovis, Rochester, MN (US); Daniel Paul Kolz, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 288 days.

This patent is subject to a terminal disclaimer.

(21) Appl. No.: 12/112,932

(22) Filed: Apr. 30, 2008

(65) Prior Publication Data

US 2008/0201495 A1 Aug. 21, 2008

Related U.S. Application Data

(63) Continuation of application No. 11/246,827, filed on Oct. 7, 2005, now Pat. No. 7,533,198.

(51) Int. Cl.
*G06F 13/28* (2006.01)
*G06F 12/00* (2006.01)
*G06F 13/00* (2006.01)

(52) U.S. Cl. .................. 710/26; 710/22; 710/25; 711/161; 711/162

(58) Field of Classification Search .............. 710/22, 710/25, 26; 711/161, 162
See application file for complete search history.

(56) References Cited

U.S. PATENT DOCUMENTS

| 4,590,467 | A |   | 5/1986  | Lare |
| 4,658,351 | A | * | 4/1987  | Teng ............................ 718/103 |
| 5,276,848 | A | * | 1/1994  | Gallagher et al. ............ 711/121 |
| 5,463,739 | A | * | 10/1995 | Albaugh et al. ................. 710/6 |
| 5,640,527 | A | * | 6/1997  | Pecone et al. .................... 711/5 |
| 5,778,427 | A | * | 7/1998  | Hagersten et al. ............ 711/128 |
| 2004/0064601 | A1 | * | 4/2004 | Swanberg ..................... 710/22 |
| 2006/0069818 | A1 |   | 3/2006 | Mather et al. |

* cited by examiner

*Primary Examiner*—Niketa I Patel
*Assistant Examiner*—Farley J Abad
(74) *Attorney, Agent, or Firm*—Martin & Associates LLC; Derek P. Martin

(57) ABSTRACT

A memory controller provides page copy logic that assures data coherency when a DMA operation to a page occurs during the copying of the page by the memory controller. The page copy logic compares the page index of the DMA operation to a copy address pointer that indicates the location currently being copied. If the page index of the DMA operation is less than the copy address pointer, the portion of the page that would be written to by the DMA operation has already been copied, so the DMA operation is performed to the physical address of the new page. If the page index of the DMA operation is greater than the copy address pointer, the portion of the page that would be written to by the DMA operation has not yet been copied, so the DMA operation is performed to the physical address of the old page.

8 Claims, 5 Drawing Sheets

HANDLING DMA OPERATIONS DURING A PAGE COPY

CROSS-REFERENCE TO PARENT APPLICATION

This patent application is a continuation of U.S. Ser. No. 11/246,827 filed on Oct. 7, 2005, which is incorporated herein by reference.

BACKGROUND OF THE INVENTION

1. Technical Field

This invention generally relates to computer systems, and more specifically relates to the processing of Direct Memory Access (DMA) requests in computer systems.

2. Background Art

Modern computer systems typically have memory that is organized into pages. Moving pages of memory in a computer system is an important maintenance item that helps provide optimal performance and keeps the computer system functional. Pages of memory are typically moved by invalidating a current virtual-to-physical address map entry in an address translation table, copying the page from the old physical location to the new physical location, and adding a new address map entry into the address translation table that has the old virtual address linked to the new physical address.

Direct Memory Access (DMA) operations may be initiated by I/O devices to directly transfer data to and from memory. A DMA operation that occurs during the copying of a memory page could potentially cause data coherency problems. For example, let's assume a memory controller decides to move a page of memory from location A to location B in memory. In the prior art, it is possible for the DMA controller to write to block A before the move from block A to block B is complete. If the write to block A occurs at a location that has already been copied to block B, block B now has stale data, which can result in a system crash.

One known way to solve the data coherency problem that might be caused by DMA operations is to disable DMA operations during page copies. In some system topologies, it is difficult or impossible for the hardware to halt DMA operations without causing the system to crash. Even if DMA operations could be halted, there are business applications where halting DMA operations would result in unacceptable response times. Thus, if a memory manager is performing a move of data from a first page to a second page, the DMA controller could access data in the first page after that portion of the first page was already moved, resulting in a data coherency problem. Without a way to assure data coherency in a computer system that includes a DMA controller without halting the DMA I/O operations during a page copy operation, the computer industry will continue to suffer from potential crashes and other problems due to data coherency problems caused by DMA operations.

DISCLOSURE OF INVENTION

According to the preferred embodiments, a memory controller provides page copy logic that assures data coherency when a DMA operation occurs during the copying of a page of memory by the memory controller. The page copy logic determines whether the virtual address of the DMA operation is on the page being copied. If so, the page copy logic compares the page index of the DMA operation to a copy address pointer that indicates the location currently being copied. If the page index of the DMA operation is less than the copy address pointer, the portion of the page that would be accessed by the DMA operation has already been copied, so the DMA operation is performed to the physical address of the new page. If the page index of the DMA operation is greater to the copy address pointer, the portion of the page that would be accessed by the DMA operation has not yet been copied, so the DMA operation is performed to the physical address of the old page. If the page index of the DMA operation is equal to the copy address pointer, the page copy logic waits until the current copy is complete, then performs the DMA operation to the physical address of the new page. In this manner, a memory controller assures coherency during a page copy operation when a DMA operation occurs.

The foregoing and other features and advantages of the invention will be apparent from the following more particular description of preferred embodiments of the invention, as illustrated in the accompanying drawings.

BRIEF DESCRIPTION OF DRAWINGS

The preferred embodiments of the present invention will hereinafter be described in conjunction with the appended drawings, where like designations denote like elements, and.

BEST MODE FOR CARRYING OUT THE INVENTION

The preferred embodiments provide a way to assure data integrity in a system where DMA transfers to memory must occur during moves of pages in memory. A memory controller provides page copy logic that assures data coherency when a DMA operation occurs during the copying of a page of memory by the memory controller. The page copy logic determines whether the virtual address of the DMA operation is on the page being copied. If so, the page copy logic compares the page index of the DMA operation to a copy address pointer that indicates the location currently being copied. If the page index of the DMA operation is less than the copy address pointer, the portion of the page that would be accessed by the DMA operation has already been copied, so the DMA operation is performed to the physical address of the new page. If the page index of the DMA operation is greater than the copy address pointer, the portion of the page that would be accessed by the DMA operation has not yet been copied, so the DMA operation is performed to the physical address of the old page. If the page index of the DMA operation is equal to the copy address pointer, the DMA operation waits until the current copy is complete, then performs the DMA operation to the physical address of the new page. In this manner, a memory controller assures coherency during a page copy operation when a DMA operation occurs.

Figure 1:
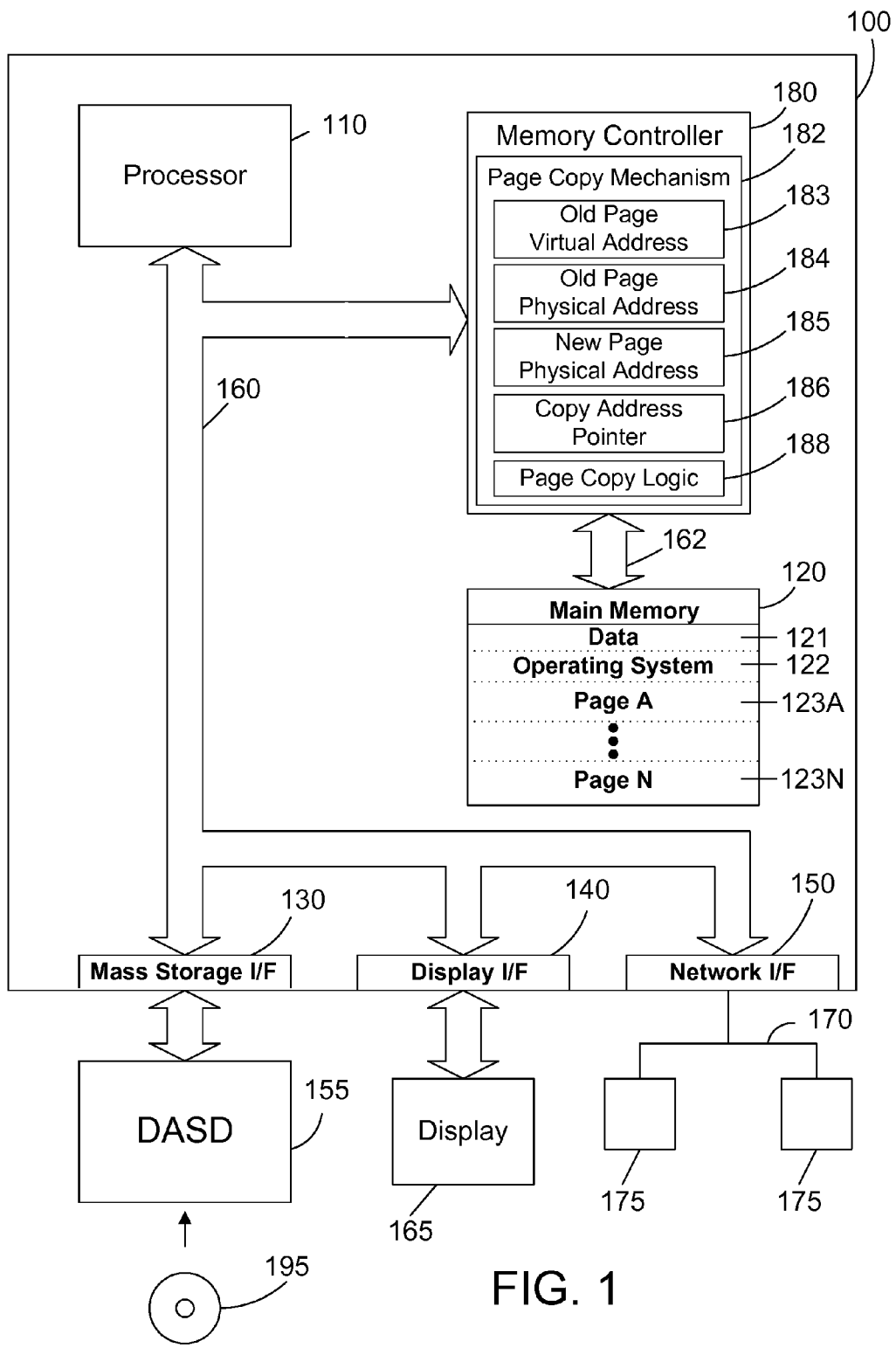
FIG. 1 is a block diagram of an apparatus in accordance with the preferred embodiments.

Referring to FIG. 1, a computer system 100 is one suitable implementation of an apparatus in accordance with the preferred embodiments of the invention. Computer system 100 is an IBM eServer iSeries computer system. However, those skilled in the art will appreciate that the mechanisms and apparatus of the present invention apply equally to any computer system, regardless of whether the computer system is a complicated multi-user computing apparatus, a single user workstation, or an embedded control system. As shown in FIG. 1, computer system 100 comprises a processor 110, a memory controller 180, a mass storage interface 130, a display interface 140, and a network interface 150. These system components are interconnected through the use of a system bus 160. Memory controller 180 is also coupled to main memory 120 via a memory bus 162. Mass storage interface 130 is used to connect mass storage devices, such as a direct access storage device 155, to computer system 100. One specific type of direct access storage device 155 is a readable and writable CD RW drive, which may store data to and read data from a CD RW 195. Another specific type of direct access storage device 155 is a hard disk drive.

Main memory 120 in accordance with the preferred embodiments contains data 121, an operating system 122, and multiple pages of memory, shown in FIG. 1 as pages 123A, ..., 123N. Data 121 represents any data that serves as input to or output from any program in computer system 100. Operating system 122 is a multitasking operating system known in the industry as i5/OS; however, those skilled in the art will appreciate that the spirit and scope of the present invention is not limited to any one operating system. Memory pages 123 represent memory pages that may be relocated as needed within the memory 120 or to a mass storage device such as DASD 155.

Computer system 100 utilizes well known virtual addressing mechanisms that allow the programs of computer system 100 to behave as if they only have access to a large, single storage entity instead of access to multiple, smaller storage entities such as main memory 120 and DASD device 155. Therefore, while data 121, operating system 122, and pages 123A, ..., 123N are shown to reside in main memory 120, those skilled in the art will recognize that these items are not necessarily all completely contained in main memory 120 at the same time. It should also be noted that the term "memory" is used herein to generically refer to the entire virtual memory of computer system 100, and may include the virtual memory of other computer systems coupled to computer system 100.

Processor 110 may be constructed from one or more microprocessors and/or integrated circuits. Processor 110 executes program instructions stored in main memory 120. Main memory 120 stores programs and data that processor 110 may access. When computer system 100 starts up, processor 110 initially executes the program instructions that make up operating system 122. Operating system 122 is a sophisticated program that manages the resources of computer system 100. Some of these resources are processor 110, main memory 120, mass storage interface 130, display interface 140, network interface 150, system bus 160, and memory controller 180.

Although computer system 100 is shown to contain only a single processor and a single system bus, those skilled in the art will appreciate that the present invention may be practiced using a computer system that has multiple processors and/or multiple buses. In addition, the interfaces that are used in the preferred embodiments each include separate, fully programmed microprocessors that are used to off-load compute-intensive processing from processor 110. However, those skilled in the art will appreciate that the present invention applies equally to computer systems that simply use I/O adapters to perform similar functions.

Display interface 140 is used to directly connect one or more displays 165 to computer system 100. These displays 165, which may be non-intelligent (i.e., dumb) terminals or fully programmable workstations, are used to allow system administrators and users to communicate with computer system 100. Note, however, that while display interface 140 is provided to support communication with one or more displays 165, computer system 100 does not necessarily require a display 165, because all needed interaction with users and other processes may occur via network interface 150.

Network interface 150 is used to connect other computer systems and/or workstations (e.g., 175 in FIG. 1) to computer system 100 across a network 170. The present invention applies equally no matter how computer system 100 may be connected to other computer systems and/or workstations, regardless of whether the network connection 170 is made using present-day analog and/or digital techniques or via some networking mechanism of the future. In addition, many different network protocols can be used to implement a network. These protocols are specialized computer programs that allow computers to communicate across network 170. TCP/IP (Transmission Control Protocol/Internet Protocol) is an example of a suitable network protocol.

The memory controller 180 provides an interface between the main memory 120 and devices that access the main memory. Memory controller 180 performs traditional memory control functions as is known in the art. In addition, memory controller 180 includes a page copy mechanism 182 that allows DMA operations during a copy of a memory page. The page copy mechanism 182 includes several registers, a pointer, and logic that support DMA operations during a page copy. The old page virtual address register 183 contains the virtual address of the page being copied. The old page physical address register 184 contains the physical address of the page being copied. The new page physical address register 185 contains the physical address of the new page, which is the target location of the page copy. In the preferred embodiments, all three registers 183, 184 and 185 are written to by software. However, because the memory controller performs the virtual-to-physical address mapping, the memory controller 180 could determine from a virtual address in 183 the corresponding physical address to write to 184, and could likewise determine from a physical address in 184 a corresponding virtual address to write to 183. The copy address pointer 186 contains a pointer that points to the next portion of the old page that needs to be copied. The page copy logic 188 contains the intelligence needed to handle a DMA operation to a page that is being copied. The page copy logic 188 first determines whether the DMA operation is to the page being copied. If so, a page index of the DMA operation is compared to the value stored in the copy address pointer 186. This determines whether the target location of the DMA operation is to a portion of the page that has already been copied, or that has not yet been copied. If the page index of the DMA operation is less than the copy address pointer 186, the target location of the DMA operation is to a portion of the page that has already been copied. As a result, the DMA operation is performed to the new page. If the page index of the DMA operation is greater than the copy address pointer 186, the target location of the DMA operation is to a portion of the page that has not yet been copied. As a result, the DMA operation is performed to the old page, and the page copy operation will eventually copy the newly-written data to the new page. If the page index of the DMA operation is equal to the copy address pointer 186, the page copy logic 188 waits until the copy of the cache line at the copy address pointer 186 is complete, and the DMA operation is then performed to the new page. In this manner, data coherency is maintained even when DMA operations to a page occur during a copy of the page.

The memory controller 180 is shown in FIG. 1 to be separate from processor 110. Note, however, that the memory controller 180 could also reside within the processor 110 within the scope of the preferred embodiments.

Figure 2:
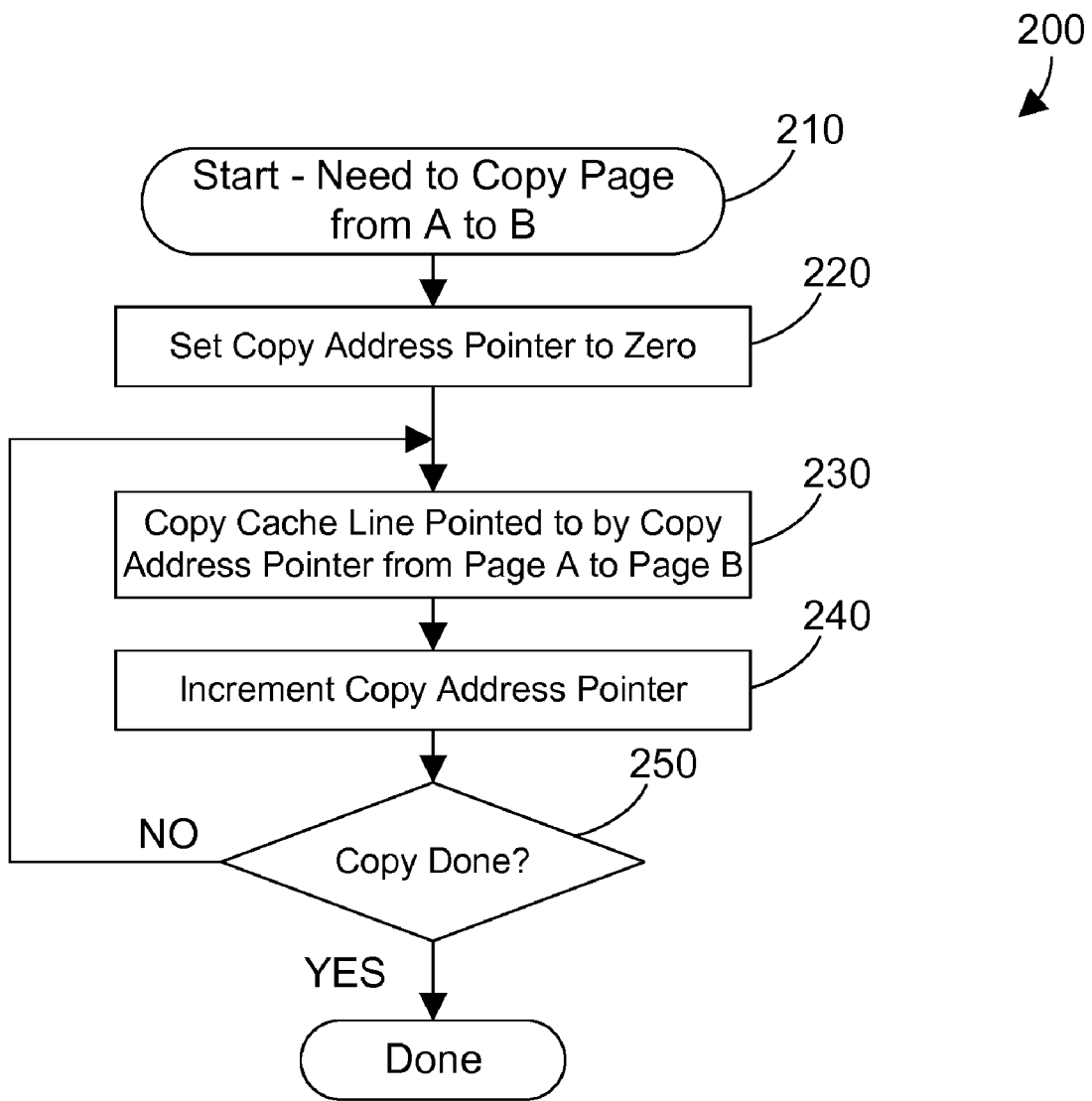
FIG. 2 is a flow diagram of a method in accordance with the preferred embodiments.

Referring to FIG. 2, a method 200 in accordance with the preferred embodiments begins when a page of memory needs to be copied from location A to location B (step 210). First, the copy address pointer is set to zero (step 220). The cache line pointed to by the copy address pointer is then copied from page A to page B (step 230). The copy address pointer is then incremented (step 240). If the copy is not done (step 250=NO), method 200 loops back to step 230 and continues. Once the copy is done (step 250=YES), method 200 is done.

The copy of a page as shown in method 200 for an iSeries computer system typically uses a page size of 4K bytes and a cacheline of 64 bytes, which results in 64 cacheline writes to perform a page copy. In this specific example, the copy address pointer points to the cache line that is currently being copied or that will be copied next.

Figure 3:
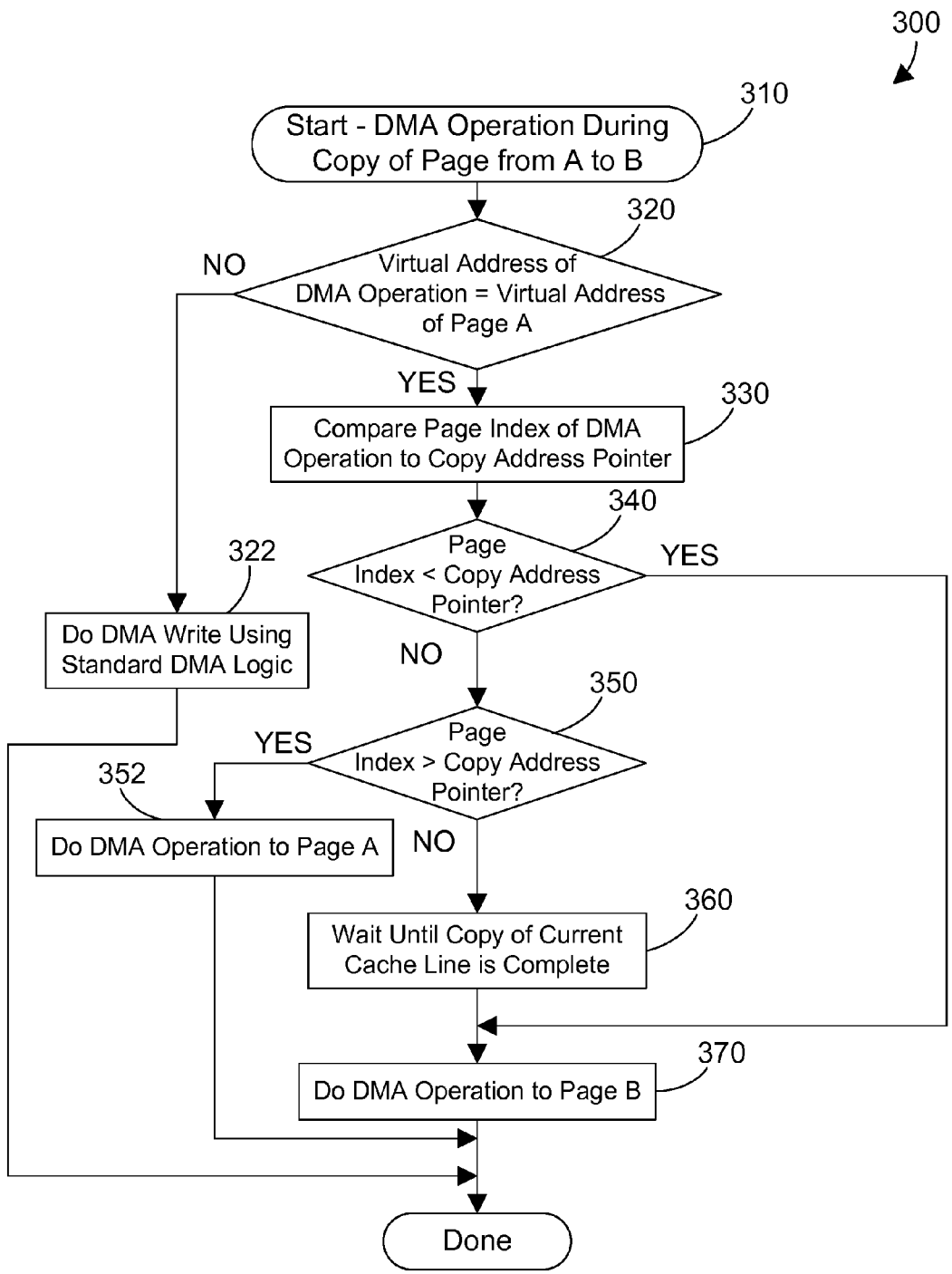
FIG. 3 is a block diagram of a method in accordance with the preferred embodiments.

Referring to FIG. 3, a method 300 in accordance with the preferred embodiments shows how a DMA operation is handled during a page copy. We assume for this example that a DMA operation specifies a DMA Operation Address that includes a virtual address of a page and a page index that points to what portion of the page to access. Method 300 starts when a DMA operation occurs during a copy of page A to page B (step 310). The virtual address of the DMA operation is compared to the virtual address of page A being copied (step 320). If the virtual address of the DMA operation does not equal the virtual address of page A (step 320=NO), there is no potential conflict between the DMA operation and the page copy operation, so the DMA operation is done using standard DMA logic, as is known in the art (step 322). If the virtual address of the DMA operation equals the virtual address of page A (step 320=YES), the DMA operation is to the same page being copied. As a result, the page index of the DMA operation is compared to the copy address pointer (step 330). If the page index of the DMA operation is less than the value stored in the copy address pointer (step 340=YES), the DMA operation is done to page B (step 370), the new page, because the portion of the page targeted by the DMA operation has already been copied to page B. If the page index of the DMA operation is greater than the value in the copy address pointer (step 340=NO and step 350=YES), the DMA operation is done to page A (step 352), the old page, because the portion of the page targeted by the DMA operation has not yet been copied to page B. As a result, if the DMA operation is a write to page A, the data will then be copied to page B in due course when the copy address pointer points to the cache line that contains the new data, as shown in method 200 in FIG. 2. If the page index of the DMA operation is equal to the value in the copy address pointer (step 340=NO and step 350=NO), the page copy logic waits until the copy of the current cache line is complete (step 360). Once the copy of the current cache line is complete, the DMA operation is performed to page B (step 370).

Figure 4:
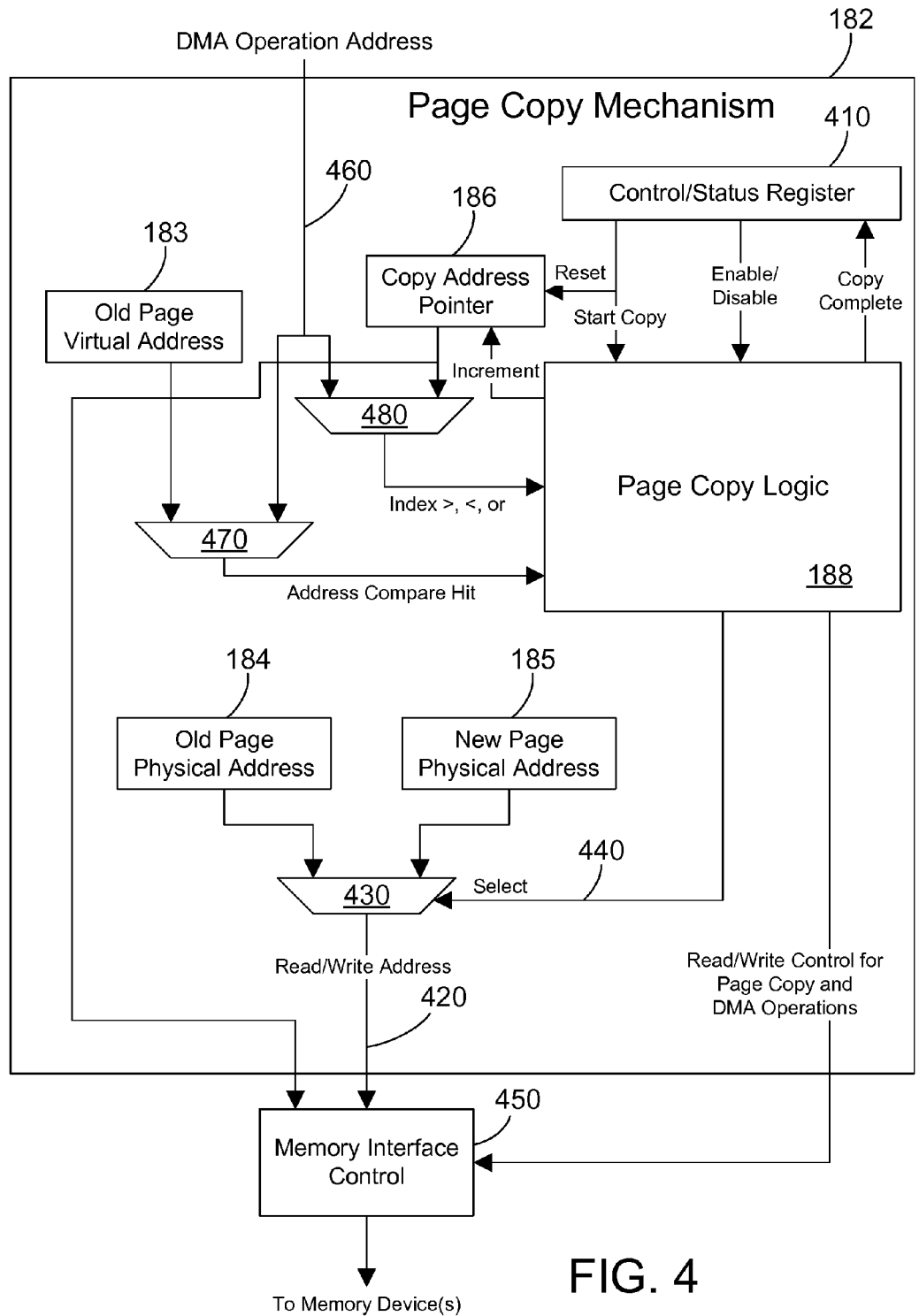
FIG. 4 is a block diagram of one specific implementation of the page copy mechanism of FIG. 1 in accordance with the preferred embodiments.

Referring to FIG. 4, one specific implementation of the page copy mechanism 182 within the scope of the preferred embodiments is shown. The page copy mechanism 182 includes the old page virtual address register 183, the old page physical address register 184 and the new page physical address register 185. Note that the registers 183, 184 and 185 may be written to by software that needs to perform a page copy. The copy address pointer 186 is also shown. A control/status register 410 is also provided that may be used to enable and disable the page copy mechanism 182. The control/status register 410 preferably includes a bit that is used to enable the page copy mechanism 182 when a page copy is about to occur, and to disable the page copy mechanism 182 after a page copy is complete. The control/status register 410 also includes a status bit received from the page copy logic 188 that indicates when the page copy is complete. This bit may be polled by the memory controller 182, or may generate an interrupt.

When a page needs to be copied, the memory controller 182 writes to the control/status register 410 to enable the page copy mechanism 182, and to start the page copy operation. The start of the page copy operation resets the copy address pointer 186 to zero. The copy of the old page then begins. The read/write address 420 is driven by a multiplexer 430, which selects either the old page physical address 184 or the new page physical address 185 depending on the status of the select signal 440 received from the page copy logic 188. When data is read from the old page, the select signal 440 selects the old page physical address 184. When data is written to the new page, the select signal 440 selects the new page physical address 185. The page index comes from the copy address pointer and is used to address the current cache line inside of the page being copied. In this manner, the appropriate address is provided to the memory interface control 450.

Now we assume that a DMA operation occurs during the copy of the old page to the new page. The DMA Operation Address 460 is compared to the old page virtual address 183 using comparator 470. If they match, this means the DMA operation is to the same page (old page) that is in the process of being copied. The portion of the DMA Operation Address 460 that corresponds to the page index is then compared to the value in the copy address pointer 186 using comparator 480. If the page index of the DMA Operation Address 460 is less than the value in the copy address pointer 186, the portion of the old page being accessed by the DMA operation is a portion that has already been copied to the new page. As a result, the select line 440 is driven to select the new page physical address 185 as the target of the DMA operation. If the page index of the DMA Operation Address 460 is greater than the value in the copy address pointer 186, the portion of the old page being accessed by the DMA operation is a portion that has not yet been copied to the new page. As a result, the select line 440 is driven to select the old page physical address 184. If the page index of the DMA Operation Address 460 is equal to the value in the copy address pointer 186, this means the cache line currently being copied is the target of the DMA operation. The copy of the current cache line must be completed before the DMA operation is allowed to proceed. If the current cache line is the last cache line in the page, the Copy Complete bit is set in the control/status register 410 when the copy of the cache line is completed. If the current cache line is not the last cache line in the page, the Copy Address Pointer 186 is incremented when the copy of the cache line is completed. Once the copy of the current cache line is completed, the select line 440 is driven to select the new page physical address 185. In this manner, the page copy mechanism 182 provides data coherency for DMA operations even when a DMA operation targets a page that is in the process of being copied. The DMA operations can be performed without delay, which supports DMA transfers on a PCI-E bus, while still providing data coherency during page copy operations.

Figure 5:
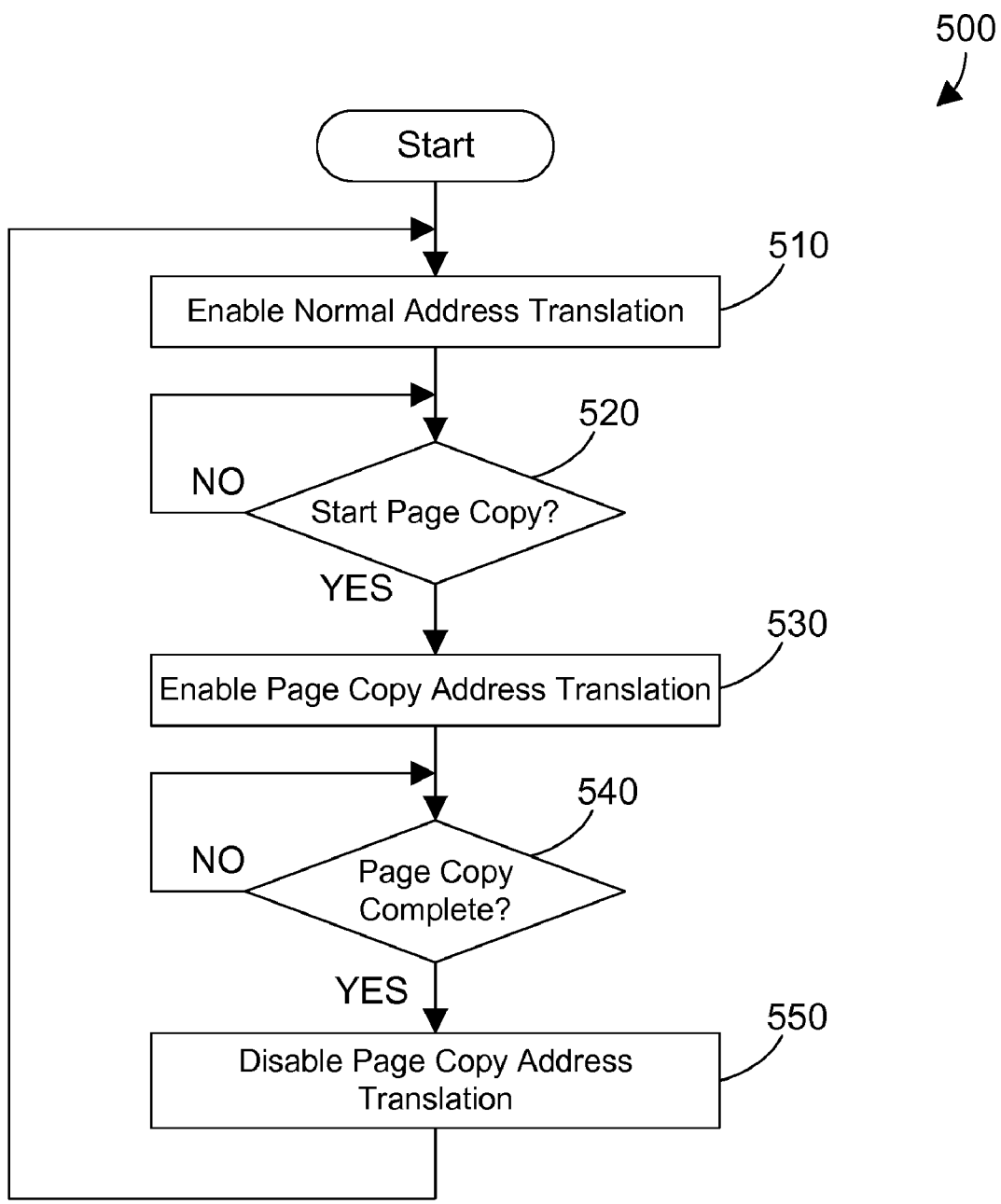
FIG. 5 is a flow diagram of a method for changing address translation modes in accordance with the preferred embodiments.

Referring to FIG. 5, a method 500 in accordance with the preferred embodiments begins by enabling normal address translation (step 510). The normal address translation continues until a page copy is started (step 520=YES). Once a page copy is started, the page copy address translation is enabled (step 530). The enablement of the page copy address translation in step 530 is the enabling of the page copy mechanism 182 in FIG. 4, which is suitably performed by writing an appropriate value to the control/status register 410. The page copy address translation remains in effect until the page copy is complete (step 540=YES), at which time the page copy address translation is disabled (step 550). The disabling of the page copy address translation in step 550 is the disabling of the page copy mechanism 182 in FIG. 4, which is preferably performed by writing an appropriate value to the control/status register 410. Once the page copy address translation is disabled in step 550, normal address translation is enabled in step 510. Method 500 illustrates that normal address translation is performed at all times except when a page copy is being performed. The page copy address translation provided by the page copy mechanism 182 is enabled during a page copy by the memory controller.

The preferred embodiments provide a simple and effective way for a memory controller to assure data coherency of DMA operations that occur during a page copy operation. If the DMA operation is to the same page being copied, the page index of the DMA operation is compared to a copy address pointer that indicates the portion of the page being copied or next to be copied. If the DMA operation is less than the copy address pointer, this means the DMA operation is to a portion of the page that has already been copied, and the DMA operation is performed to the new page. If the DMA operation is greater than the copy address pointer, this means the DMA operation is to a portion of the page that has not yet been copied, and the DMA operation is performed to the old page. If the page index of the DMA operation is equal to the copy address pointer, the DMA operation waits until the current copy is complete, then performs the DMA operation to the physical address of the new page. This assures that the DMA operation is performed to the appropriate location, even when the DMA operation occurs in the middle of a page copy operation.

The ability to migrate pages of memory is becoming even more critical with the increasing market of virtualized machines. Multiple operating system images can be run on a single virtualized computer system under the control of a partition manager, referred to in iSeries terminology as a hypervisor. I/O memory management is critical for performance on a virtualized machine. The industry solution for managing I/O memory today is to intercept all I/O accesses with the partition manager. This method is not as secure as hardware I/O virtualization and penalizes system performance by 20% or more. The preferred embodiments provide a memory controller that can efficiently assure data coherency during memory page copies when DMA operations occur, thereby allowing I/O to run uninhibited by the page copy operation. The result is a simple yet powerful solution that significantly enhances system performance while ensuring I/O operations are secure.

One skilled in the art will appreciate that many variations are possible within the scope of the present invention. Thus, while the invention has been particularly shown and described with reference to preferred embodiments thereof, it will be understood by those skilled in the art that these and other changes in form and details may be made therein without departing from the spirit and scope of the invention.

The invention claimed is:

1. A memory controller comprising:
a first register that contains a physical address of a first page;
a second register that contains a physical address of a second page;
a copy address pointer that points to a location in the first page and indicates a portion of the first page currently being copied; and
page copy logic that initiates a copy of the first page to the second page, that receives a direct memory access (DMA) operation, and that determines whether the DMA operation is to the first page;
when the DMA operation is not to the first page, performing the DMA operation;
when the DMA operation is to the first page, a page index of the DMA operation is compared to the copy address pointer, and when the page index of the DMA operation is less than the copy address pointer, the page copy logic causes the DMA operation to be performed to the second page during copying of the first page to the second page, and when the page index of the DMA operation is greater than the copy address pointer, the page copy logic causes the DMA operation to be performed to the first page during the copying of the first page to the second page.

2. The memory controller of claim 1 wherein, if the page index of the DMA operation is equal to the copy address pointer, the page copy logic delays the DMA operation until the write at the copy address pointer is complete, then performs the DMA operation to the second page during the copying of the first page to the second page.

3. The memory controller of claim 1 further comprising a third register that contains a logical address of the first page that is used by the page copy logic to determine whether the DMA operation is to the first page.

4. The memory controller of claim 1 further comprising a control and status register that controls function of the page copy logic and indicates when a page copy is complete.

5. The memory controller of claim 4 wherein the control and status register allows disabling the page copy logic when a page copy is not being performed by the memory controller.

6. The memory controller of claim 1 further comprising a selection mechanism driven by the page copy logic that selects one of an address in the first page and an address in the second page.

7. A memory controller comprising:
a first page virtual address register that contains a virtual address of a first page;
a first page physical address register that contains a physical address of the first page;
a second page physical address register that contains a physical address of a second page;
a copy address pointer that points to a location in the first page and indicates a portion of the first page being currently copied;
page copy logic that begins a write of data in the first page to the second page, that receives a direct memory access (DMA) operation, and that determines whether the DMA operation is to the first page;
when the DMA operation is not to the first page, performing the DMA operation;
when the DMA operation is to the first page, a page index of the DMA operation is compared to the copy address pointer, and when the page index of the DMA operation is less than the copy address pointer, the page copy logic causes the DMA operation to be performed to the second page during copying of the first page to the second page, and when the page index of the DMA operation is greater than the copy address pointer, the page copy logic causes the DMA operation to be performed to the first page during the copying of the first page to the second page, and when the page index of the DMA operation is equal to the copy address pointer, the page copy logic delays the DMA operation until the write at the copy address pointer is complete, then performs the DMA operation to the second page during the copying of the first page to the second page; and a control and status register that controls function of the page copy logic and indicates when a page copy is complete and allows disabling the page copy logic when a page copy is not being performed by the memory controller.

8. A memory controller comprising:

a first page virtual address register that contains a virtual address of a first page;

a first page physical address register that contains a physical address of the first page;

a second page physical address register that contains a physical address of a page;

second a copy address pointer that points to a location in the first page and indicates a portion of the first page being currently copied;

page copy logic that performs the steps of:
 (A) enabling normal address translation;
 (B) when a page copy needs to be performed from the first page to the second page, performing the steps of:
  (B1) enabling page copy address translation;
  (B2) determining whether a DMA operation is to the first page by comparing a virtual address of the DMA operation to a range of virtual addresses corresponding to the first page;
  (B3) when the DMA operation is not to the first page, performing the DMA operation;
  (B4) when the DMA operation is to the first page, performing the steps of:
   comparing a page index of the DMA operation to the copy address pointer;
   when the page index of the DMA operation is less than the copy address pointer, a hardware selection mechanism causing the DMA operation to be performed to the second page during the copying of the first page to the second page;
   when the page index of the DMA operation is greater than the copy address pointer, the hardware selection mechanism causing the DMA operation to be performed to the first page during the copying of the first page to the second page;
   when the page index of the DMA operation is equal to the copy address pointer, performing the steps of:
    delaying the DMA operation until a copy at the copy address pointer from the first page to the second page is complete; and
    performing the DMA operation to the second page during the copying of the first page to the second page;
 (C) when the page copy in step (B) is complete, performing the steps of:
  disabling page copy address translation; and returning to step (A).

* * * * *